April 5, 1960 R. J. LOOFBOURROW 2,931,455
ACOUSTIC LOGGING OF WELLS
Original Filed April 22, 1950 2 Sheets-Sheet 1
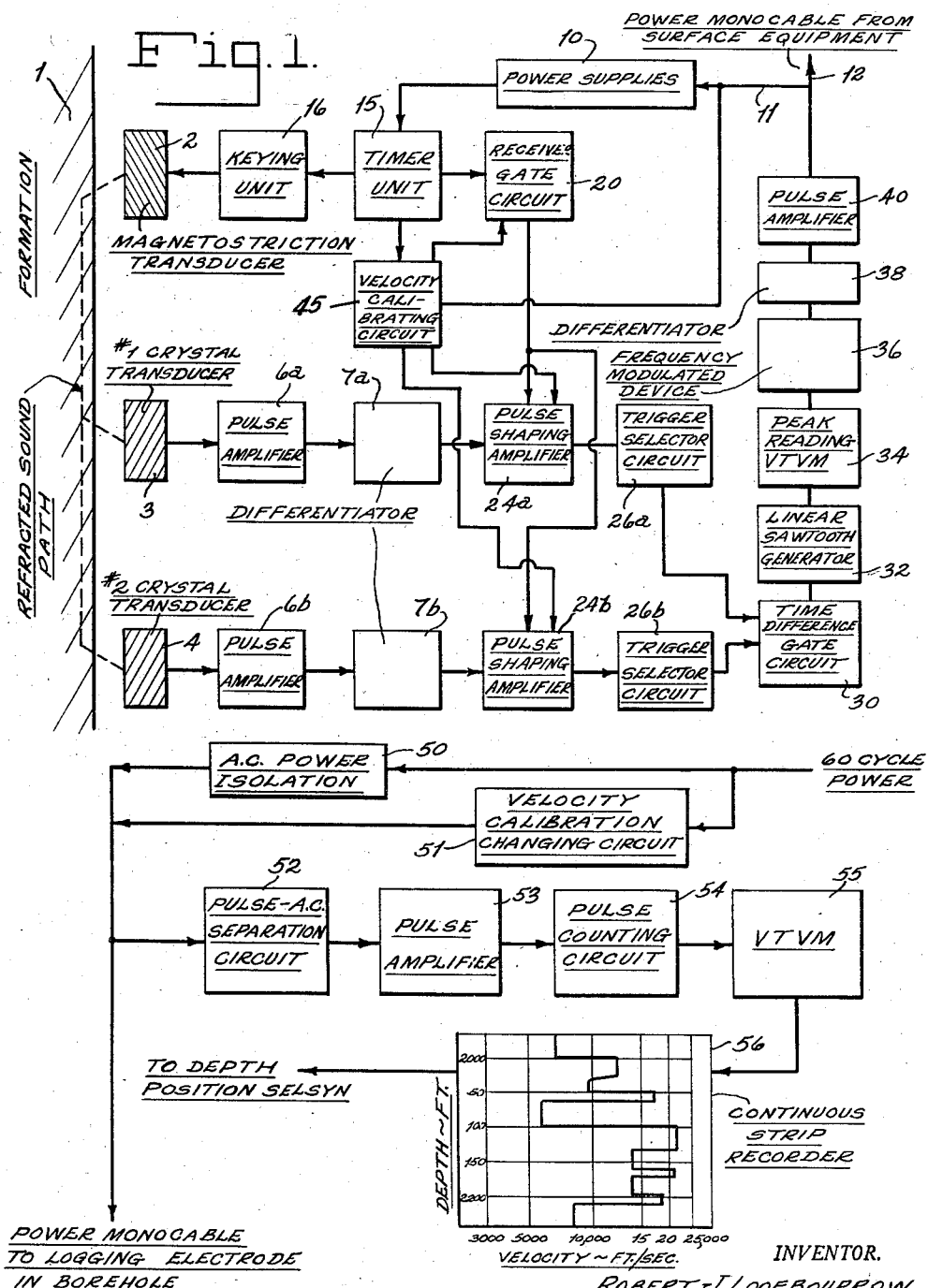
INVENTOR.
ROBERT J. LOOFBOURROW
BY
ATTORNEYS April 5, 1960 R. J. LOOFBOURROW 2,931,455
ACOUSTIC LOGGING OF WELLS
Original Filed April 22, 1950 2 Sheets-Sheet 2
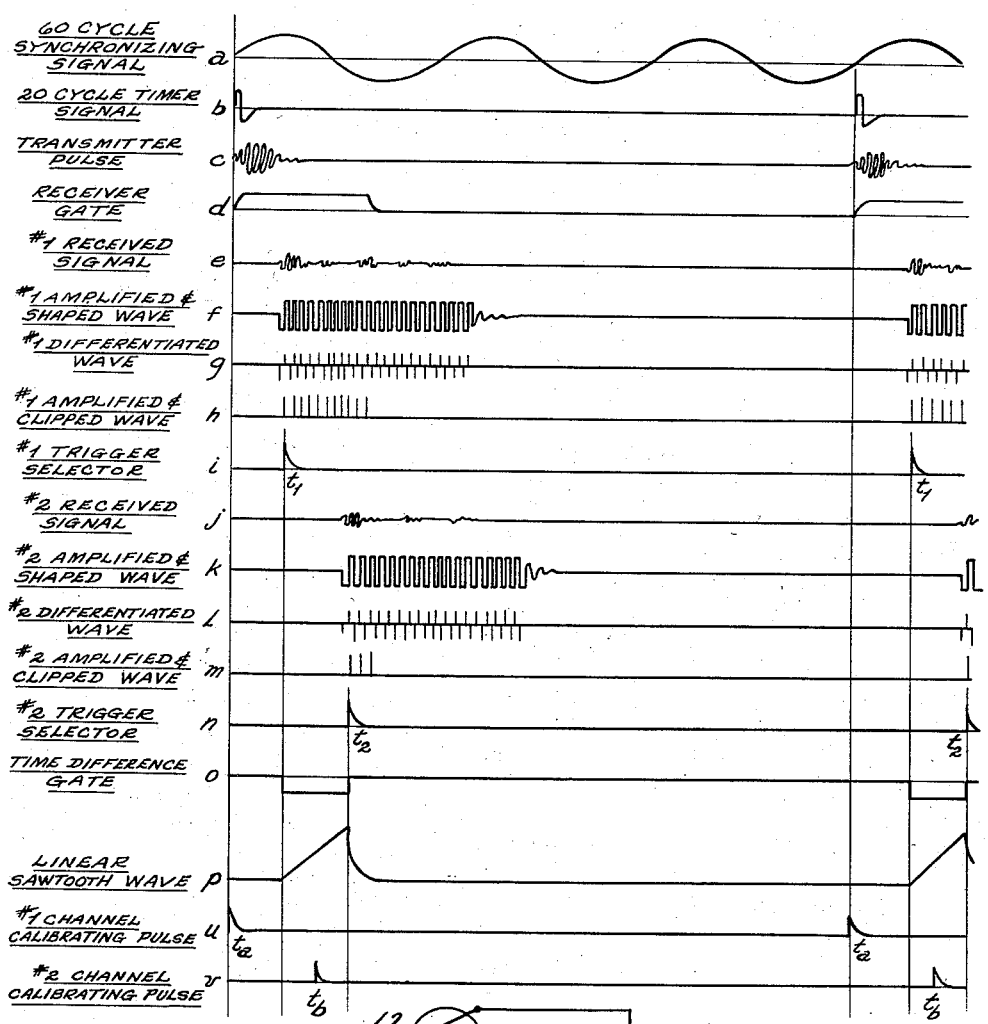
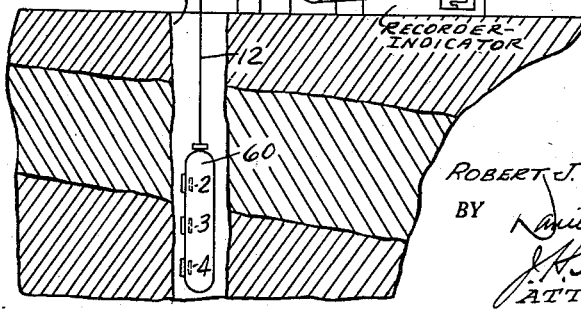
INVENTOR.
ROBERT J. LOOFBOURROW
BY
ATTORNEYS _United States Patent Office_

2,931,455
Patented Apr. 5, 1960

2,931,455
ACOUSTIC LOGGING OF WELLS

Robert J. Loofbourrow, Bellaire, Tex., assignor to Texaco Inc., a corporation of Delaware Continuation of application Serial No. 157,495, April 22, 1950. This application March 29, 1956, Serial No. 574,844

19 Claims. (Cl. 181—.5)

This invention relates to acoustic logging of wells for determining the character and arrangement of subsurface strata penetrated by a bore hole.

This application is a continuation of my copending application Serial No. 157,495, filed April 22, 1950, now abandoned, entitled Acoustic Logging of Wells.

The invention has to do with the logging of an earth bore wherein a pulse of sound is generated at a point in the bore so as to cause propagation of a sound wave through the surrounding earth strata and the transmitted sound wave is detected with at least two receptors spaced a predetermined distance apart in the bore hole and also being spaced apart from the point of sound generation. The sound energy received by the receptors is converted into electrical waves of the same frequency. The wave train outputs from each receptor are separately amplified so that the initial cycles of the wave trains are reshaped into square waves of the same frequency. The time differential between the leading edges of the first cycles of the respective trains of square waves is determined, this differential being inversely proportional to the velocity of the sound wave traveling through the aforesaid strata. More particularly, the invention comprises obtaining electrical wave output trains from each receptor, separately amplifying these wave trains such that they are squared and clipped off at the same level, differentiating each train of square waves, separately amplifying the resulting differentiated wave trains such that the negative pulses are clipped and removed, and determining the time differential between the initial pulses of the two clipped and differentiated trains within a selected time interval.

It has been proposed heretofore to survey wells by generating sound waves at one level by means of a suitable sound generating device such as a magneto-striction unit or a piezoelectric crystal, etc., and measuring the velocity of sound propagation through the surrounding earth strata, thereby determining the acoustic properties of the strata. The determinations may be made at different levels so as to ascertain the variation in acoustic properties of the strata throughout the well. The velocity may be measured by determining the time difference or lapse between transmitted and received pulses. Thus, if the transmitter and receptor are separated a known distance $d$, then $$v = \frac{d}{t}$$

where $v$ = velocity of propagation
$d$ = distance of travel
$t$ = time of travel.

As indicated by the foregoing equation, the velocity is inversely proportional to the time of travel.

The present invention involves transmitting sound energy in the form of pulses at selected intervals of time and measuring the differential in time between detection of the pulses received by each of two receptors spaced a fixed distance apart in the well, both being spaced from the transmitter such that the transmitter sound signal passes both receptors traveling in the same direction. The invention is particularly concerned with measuring this time differential within an accuracy of ± 2 percent.

In accordance with this invention, sound waves having frequencies in the range of about 10 to 60 kilocycles per second and preferably in the ultrasonic region, that is in the frequency range above the upper limit of the human ear, are transmitted in periodic bursts. With frequencies substantially above 60 kilocycles there is very rapid attenuation of the sound waves in solid earth formations. For example, a beam of sound waves having a frequency of 1.6 megacycles transmitted by a quartz crystal transducer will penetrate a limestone formation only some two or three inches before it is attenuated below the level necessary to operate a receiver system. At 456 kilocycles the same formation is penetrated some fifteen inches before becoming substantially attenuated. However, with very low frequencies the accuracy of measurement becomes very poor.

According to this invention, ultrasonic frequencies up to about 40 to 60 kilocycles are preferable such that penetrations of at least several feet, for example, two to fifteen feet, are secured and, therefore, sufficient to traverse the depth of strata existing between the two receptors before becoming highly attenuated.

The burst of vibrations produced builds up exponentially and also decreases exponentially but at a somewhat slower rate than for the build-up. The length of pulse is usually several hundred micro-seconds where one micro-second is one-millionth of a second. It is desirable to have the build-up time of the wave train as short as possible, preferably in the first or second cycle, so that these cycles can be used to initiate and terminate a time measuring electrical circuit. Thus, by using two receptors with a fixed distance between them, the selected cycle as received at the first receptor initiates the time measuring circuit while the same cycle as received at the second and more distant receptor cuts off the time circuit, whereby the time of sound travel is measured.

A factor of this invention involves determining the time difference between the respective starting times of the first cycles in the wave outputs from the two receptors, which latter convert the received sound waves into electrical waves of the same frequency.

Considering the usual sinusoidal wave curve the slope of the first quarter cycle is changing from the zero point to the maximum value. There is a point at which the slope of the wave is maximum and this is as it passes through zero magnitude. There is no amplitude to the signal at this point and the electrical output of the receptor is quite small and usually is only a few thousandths of a volt. Therefore, this small signal must be amplified such that its amplitude is great enough to utilize.

The present invention involves using an electrical system which is particularly well adapted to amplify the initial wave or waves of the signals received by the receptors and determining accurately the time differential there-between.

In order to describe the invention in more detail, reference will now be made to the figures of the accompanying drawing.

Figure 1 illustrates schematically and by block diagram the subsurface equipment.

Figure 2 illustrates schematically and by block diagram the surface equipment.

Figure 3 illustrates the acoustical logging wave forms obtaining at different points in the system.

Figure 4 represents diagrammatically a suitable arrangement of certain principal components of apparatus embodying this invention for its use in the field.

In referring to Figure 4 of the drawing, it will be understood that the electrical elements indicated therein are actually embodied within an elongated cylindrical closed shell 60 of relatively small diameter such that it can be lowered and raised within the earth bore 61. This shell and the three transducers (2, 3, 4) which are mounted within it constitute a unitary structure which is attached to a conductor cable 12 and constitute what may be referred to as a well logging tool. In the use of this apparatus the tool 60 is raised and lowered in the bore 61 by respectively winding and unwinding the cable 12 onto and off of a reel 62, this being accomplished by appropriate actuation of a prime lever 63 which may simultaneously and synchronously drive a recorder-indicator 64.

In Figure 1 the numeral 1 designates the earth formation penetrated by an earth bore. Numeral 2 designates a magneto-striction transmitting transducer operating in the range of 10 to 60 kilocycles. The metal used for this transducer advantageously is a nickel-iron alloy in a laminated stack to reduce hysteresis losses. The distance between the radiating faces defines a half wave length of motion since this is the lowest frequency that can be excited in the metal.

The faces of the magneto-striction unit are coupled to the formation being surveyed by means of a fluid such as water, brine or oil. In other words, the level of fluid in the earth bore is maintained above the transducer.

In normal operation, the transmitted pulse has a wave form such as pictured in Figure 3 and designated by the letter (c).

Numerals 3 and 4 designate the two receptors respectively of rather conventional type. These may consist of diaphragm pressure operated ADP crystals (ammonium dihydrogen phosphate). The crystals are coupled through an oil film to the diaphragm which has an oil film coupling to a neoprene cap. This cap or cover is in contact with the fluid in the well which acoustically couples it with the formation being surveyed.

The receptors 3 and 4 are spaced apart a distance of about two to three feet while the receptor 3 is spaced apart from the transmitting transducer 2 a similar distance.

The ADP crystal has an extremely low internal capacity and consequently must necessarily operate into an extremely high impedance amplifier circuit. This amplifier input impedance can be kept high by means of a negative feed back. A cathode follower tube with the grid returned to a tap on its cathode resistor has the property of increasing the apparent input impedance many times the value of the grid resistor. Such a circuit is used as an impedance matching device between the crystal and the input to the rest of the amplifying stages. This cathode follower is located in proximity with the crystal and is energized by a multiconductor cable.

The output from the foregoing preamplifier is fed to a high gain wide band pules type amplifier 6a. The purpose of this amplifier is to amplify the weak received sound pulse until the initial cycle of the burst of energy is of sufficient amplitude to be clipped on the positive and negative peaks, leaving a square wave of voltage whose sides are essentially vertical and the frequency of which is identical with the initial wave, the peak-to-peak value of this square wave being in the order of 150 volts. The squaring-up process is carried out by grid limiting and plate cut-off in the various stages of the amplifier. The squared-up version and the original signal are pictured in Figure 3 by the letters (f) and (e), respectively.

The output of the preamplifier in the transducer 4 is likewise fed to a similar type amplifier 6b.

The leading edge of a square wave is ideal to define an instant in time since there is a rapid change or slope of the wave form over a very short interval of time while the slope for the rest of a half cycle is constant. Accordingly, the outputs from the amplifiers 6a and 6b are fed to wave differentiators 7a and 7b, respectively. The resistance-capacity circuit of the differentiators is such that it is possible to take the approximate differential of the square wave. The differential is a wave which changes only when the slope of the square wave changes and this differentiated wave is shown by the letter (g) in Figure 3.

The numeral 10 designates the power supplies for developing the necessary plate power for all of the amplifiers and waveform generating circuits. It also supplies the voltage used to generate the sound pulse in the magneto-striction unit 2. A bias circuit supplies all necessary bias voltages for the many stages. A filament power circuit heats all of the tube filaments and is used to synchronize the timer unit, to which reference will be made later. The power supplies are fed through a lead 11 from the power cable 12.

While it should be understood that plate-power, heater-power, and bias supplies should all be connected as required to any components of the logging tool which include discharge devices, e.g., vacuum or gas tubes, yet, inasmuch as the exact manner in which these connections are to be made does not constitute an essential feature of this invention but instead may be in accordance with various appropriate teachings of the prior art, they are not all shown in the drawing herein to avoid needless complication thereof.

The cable 12 is of coaxial type and may be 11,000 feet in length, for example. This cable actually provides a two-wire circuit from the surface to the tool. There is a single center conductor and an outside shield or shields, which provides the second electrical conductor. It is used to supply A.C. power at 240 volts to the tool from the surface equipment. The frequency modulated pulses out of the tool, as later referred to, are also sent up the cable to the surface equipment with separating networks at each end to separate the 240-volt 60-cycle power from the high frequency pulses.

The numeral 15 designates a timer unit which sets the pulse recurrence frequency at the desired intervals, for example, at a frequency of 20 cycles per second. This unit is locked in or synchronized by a 60 cycle signal from the power cable 12. This latter signal curve is designated by the letter (a) in Figure 3. Thus, the sequence of events take place at a given rate which will not vary or change under adverse conditions. The output of the timer is a single one-microsecond pulse which is used to trigger off the keying unit, the receiver gate circuit and the velocity calibrating circuit, subsequently referred to. The timer unit consists of a blocking oscillator synchronized by a 6.3-volt 60-cycle from the filament circuit. The output wave form is pictured by wave (b) in Figure 3.

The keying unit 16 is an electronic switch gas tube which applies, for example, a 450-volt 12-ampere surge of direct current to the windings of magneto-striction sound projector 2. The peak electrical power may be 5.4 kilowatts with the pulse lasting for only about 100 microseconds. There is zero power for the rest of the cycle while the entire process is repeated during the next sequence of operations or cycle. A thyratron gas tetrode is used for the switch tube and is actuated or fired by the one-microsecond trigger from the timer unit. When the voltage of the condenser in the plate circuit drops to a certain value (determined by the tube characteristics), the tube extinguishes itself and remains non-conducting allowing the condenser to recharge until another trigger arrives at the highly negatively biased grid to cause the tube to conduct again.

The numeral 20 designates a receiver gate circuit. The velocity measuring device operates on the first or fastest pulse arrival from the transmitter 2. This faster pulse will be the one through the formation which is always faster than that through the water or well fluid. Since there is a fixed distance between the receptors the longest and shortest periods of time delay can easily be calculated, these periods corresponding to the lowest and highest velocities. Any other signals arriving after the calculated period are superfluous and should be ignored since they might trigger the time circuits several times during the entire cycle instead of just once, as desired. These undesired signals can be eliminated by turning on the receiver for the period required to receive the proper formation velocity signal and then rendering it inoperative for the rest of the cycle. This can be accomplished by sending a pulse of voltage to a switching tube in the receiver channels to turn them on, the duration of this pulse being long enough to get the lowest velocity to be recorded. Such a pulse of voltage is called a time gate. This gate opens the receiver circuit for proper operation during a certain time period which is the same portion of each cycle. This gate wave is designated by the letter (d) in Figure 3. By referring to the letter (f) in Figure 3, it will be seen that the receiver actually may have a multiplicity of receiver signals arriving, all amplified sufficiently to fill up a large portion of the entire cycle. As indicated by the letter (h) in Figure 3, only the part of the pulses occurring during the receiver gate are selected for the velocity measurements.

In Figure 3 the letters j, k, l, m and n designate the waves in the channel from transducer 4 and are analogous to the waves designated by the letters e, f, g, h and i in the channel from transducer 3.

The differentiated wave forms (g and l of Figure 3) are fed into pulse shaping amplifiers 24a and 24b, respectively, where the negative pulses are clipped and removed and the positive pulses are amplified. As a result, only the pulses having the wave forms indicated at (h) and (m) in Figure 3 are allowed to appear in the output. The output is inoperative for the rest of the entire cycle. Only the first pulse of each burst of positive pulses from each of the channels is of interest.

Since only the first pulse of the wave forms indicated by (h) and (m) in Figure 3 is of interest, circuits 26a and 26b, respectively, are used to define this instant of time. A gas tube can be used to fire once; to thereafter remain ionized in the short intervals between the successive trigger pulses of the train; and then to recover soon after the end of the time gate pulse at which time no more trigger pulses will be appearing in the outputs of the pulse shaping amplifiers until the next transmit-receive cycle of supersonic waves. This can be done by using an RC charging device in the plate circuit such that the time constant is long compared to the time gate length but less than the period of the cycle of operation. An inductance in the cathode circuit will produce a single pulse, as pictured by the wave forms (i) and (n), which occurs at the time of the first pulse in the string of receiver pulses. Although there may be a small delay of 1 or 2 microseconds between the firing of the gas tube and the first pulse of the string of pulses, this will not hurt in the final results since the other channel also will have a similar delay, but the time difference will remain essentially the same. The delay is caused by the time necessary to ionize the gas molecules allowing the gas tube to fire.

The outputs from the trigger circuits 26a and 26b are fed into a time difference gate circuit 30. The function of this circuit is to create a time difference negative gate, the beginning of which is initiated by the first trigger and the end of which is defined by the second trigger. Thus, the duration of the gate is equal in time to the difference in time between the two triggers. This negative time gate can be created by a "scale of two" circuit or so-called "Eccles-Jordan" circuit. The triggers should be coupled to the scale of two through properly connected decoupling diodes for positive action. The wave form of the output from the gate circuit 30 is indicated by the letter (o) in Figure 3. The output from the circuit 30 is fed into a linear saw-tooth generator 32 wherein the negative time gate is now utilized to generate an extremely linear saw-tooth wave, as shown by the letter (p) in Figure 3. The duration or length of this saw tooth is equal to that of the time gate. The leading edge of the negative gate initiates or starts the saw-tooth wave and the trailing edge terminates it. Since the saw tooth is rising at a linear rate, the peak value will be proportional to the length of time that the saw-tooth is on. Therefore, the peak value will be proportional to the time difference between the receivers. The time is inversely proportional to the velocity and so the peak value of the saw tooth is likewise inversely proportional to the velocity.

The saw-tooth wave form is generated by means of a high vacuum or "hard" tube whose grid circuit is cut off by the negative time gate. The plate circuit contains a resistor-condenser combination which begins to charge the condenser toward the plate voltage value at a given rate. Such a combination will charge exponentially rather than linearly, so a form of feed back is applied such as to linearize this wave form in what is known as a "boot strap" circuit with compensation. The saw tooth is then linear within ½ percent over the range.

The output from the saw-tooth generator is fed into a peak-detecting circuit 34 which is designated "peak reading VTVM" in the drawing due to the similarity of its operation with that of a peak reading vacuum tube voltmeter. Such a circuit is essentially a diode detector with a suitable resistor-condenser load in parallel, having a time constant which allows the combination to follow rapid changes with a minimum of lag. A cathode follower output minimized loading of the diode circuit which would otherwise cause errors in readings. The output signal is now a D.C. voltage, the magnitude of which is inversely proportional to the velocity of the sound wave through the formation.

A frequency modulated device 36 is employed to convey a representation of the magnitude of the D.C. signal to the surface. The frequency of a multi-vibrator can be linearly controlled by a D.C. signal to the grids over about a two-to-one range. Thus, the D.C. voltage directly controls the frequency of operation of a multi-vibrator, the frequency increasing with an increasing positive voltage to the grids. This multi-vibrator is free-running and controlled only by the D.C. voltage applied. The frequency now is inversely proportional to the sound velocity through the formation. Although there may be changes in the frequency variation with changes of tubes or due to aging effects, the method of calibration of the instrument will compensate for these effects. The output of the multivibrator is a square wave, the period of which varies as the applied D.C. signal voltage.

The resulting square wave from the device 36 is fed into a differentiator 38 wherein the wave is differentiated by an RC circuit and the positive pips so obtained are used to drive a cut-off pulse power amplifier 40 into the conducting region. The output of the pulse amplifier 40 is a constant width 50 microseconds pulse, one of which appears for each cycle. Thus, the number of pulses per second corresponds to the frequency in cycles per second. The number of pulses is inversely proportional to the velocity. The output pulses are fed through a properly isolating or A.C. separating network to place the pulses on the power cable 12 leading to the surface.

For versatility an instrument of this type should have some system of calibration available at all times, even in the bore hole. Therefore, a calibration circuit 45 is incorporated in the tool 60 and is controlled from the surface. A possible range in velocity would be from 3,000 to 20,000 feet per second. Convenient calibration points would be 3,000, 5,000, 10,000, 15,000 and 20,000 feet per second. Of these, the 3,000 and 20,000 points are used to set the extremes on the recording paper since 3,000 feet per second corresponds to minimum scale and 20,000 feet per second corresponds to full scale. These two points are set in the surface equipment by proper controls. Experience in a particular region may indicate other ranges of velocities than these. For example, 3,000 feet per second may be too low and 5,000 feet per second may be sufficiently low. The upper range may have to be increased to 25,000 feet per second. Only the calibrating circuit need be changed to utilize other ranges in the equipment. The accuracy of the system also depends on the accuracy of the calibrating circuit.

The calibrating circuit consists of a one shot multivibrator that is triggered by the timer pulse. A single gate is produced, the time duration of which is made equivalent to a known velocity over the interval of separation of the two crystal receivers. By differentiation, a single positive pulse is obtained from each plate of the multi-vibrator circuit and these pulses are separated in time by the duration of the gate. These pulses are pictured in wave forms $u$ and $v$ in Figure 3. The first trigger feeds into channel one of the receiver at a point behind the gating tube. The second trigger feeds channel two. Since the impulses from the formation are still arriving, it is necessary to eliminate them from the pulse shaping amplifiers. This can be done by turning off the receiver gate circuit. A combination switch, which can turn off the gate circuit and turn on the calibrating circuit, is used. By making it a stepping switch, it can also be used to change calibrating points. This way it will be necessary to go through a series of steps in sequence to return to the original velocity measuring position. The stepping relay is controlled by the surface equipment. A button on the panel is pushed to change one step at a time. This can be done with the equipment in use in the bore hole.

The surface equipment pictured in Figure 2 supplies power down the cable to the tool 60. It also feeds the calibration change pulse down the cable. It receives the frequency modulated pulses from the electrode, amplifies them and counts them in a type of integrating device. The output of the counter circuit is a D.C. voltage which is used to actuate a strip recorder controlled by a depth measuring mechanism. There are two controls on the panel used in connection with the calibrating device to set the zero position on the chart and the maximum position. These are set with the 3,000 ft./sec. and 20,000 ft./sec. positions. The strip recorder is a galvanometer type recording on photographic film giving a transparent record.

This surface equipment is essentially the same as used at the surface with radioactive logging with only a few minor changes, the velocity calibration changing circuit being the principal addition.

The 60 cycle voltage from a logging truck generator is stepped up to 240 volts by means of an isolation transformer 50 controllable by means of a variac. This increased voltage is fed down the two conductor coaxial type monocable to supply power to the logging tool 60, in the bore hole.

The velocity calibrating circuit 45 in the tool is controlled by a stepping type relay. This relay in the tool 60 is actuated by a pulse of direct current from the surface equipment. The velocity calibration changing circuit consists of a direct current source obtained from the 60 cycle power line and a push button capable of momentarily removing 60 cycle power from the monocable and replacing it with a sudden pulse of direct current, immediately replacing the 60 cycle power again. The stepping relay in the tool 60 responds only to the direct current and operates one step for each pulse of direct current received. The steps correspond to the various calibrating velocities. Thus, the strip recorder can be calibrated in terms of velocity with the tool 60 at any level in the bore hole and particularly during a logging run.

The power supplied to the tool 60 to operate the various amplifiers in the logging tool 60 is 60 cycles per second. The velocity information supplied from the tool 60 to the surface is in the form of pulses ranging possibly from 200 to 500 pulses per second. Since both of these signals appear on the monocable at the same time, it is necessary to separate them at the surface in order to record the velocity information. A simple filtering arrangement 52 eliminates most of the 60 cycle voltage, passing all of the pulses to the pulse amplifier 53.

The pulse amplifier takes the relatively low amplitude pulses and amplifies them to a magnitude capable of operating a counting device. The magnitude of all these pulses is constant in the output.

The amplified pulses are applied to an integrating device 54 in which the voltage pulses charge a capacitor to a certain value in a given time. Thus, the value of voltage on the condenser depends on the rate or frequency of the pulses. Therefore, the circuit counts the number of pulses for a given period of time. Since the frequency of the pulses is inversely proportional to the velocity, then the voltage developed by the integrating or pulse counting circuit will also be inversely proportional to the velocity.

The voltage developed by this integrator is accurately measured by means of a vacuum tube voltmeter 55, the output of which actuates a galvanometer recording, on photographic film 56, the deflection. This deflection is inversely proportional to the velocity. By moving the photographic film strip at a rate determined by the speed of travel of the tool 60 in the bore hole, a continuous strip recording is made of the velocity variations with depth. The film speed is controlled by a depth position selsyn synchronized by the cable length.

It should be noted that the velocity divisions on the record are crowded closer with increased velocities. This is caused by the inverse relationship of the voltage and velocity. The relationship can be made linear by means of a servo-mechanism of proper design.

Obviously many modifications and variations of the invention, as hereinbefore set forth, may be made without departing from the spirit and scope thereof and, therefore, only such limitations should be imposed as are indicated in the appended claims.

I claim:

1. A well logging tool having an axis to correspond with that of an earth bore when the tool is in use therein and comprising as a unitary structure a supersonic transmitting transducer and two supersonic receiving transducers supported at spaced apart positions along the tool, said tool containing: periodic pulse generating means for actuating the transmitting transducer to transmit recurrent trains of pulse modulated supersonic waves; individual means for each of the receiving transducers for amplifying trains of supersonic electrical waves produced thereby in response to mechanical wave energy received from said transmitting transducer; means effective in a portion of each period following a pulsing of the transmitting transducer for measuring the interval between the starting times of the first cycles of the separate trains of waves respectively amplified in said individual means and for producing an electrical signal having a characteristic representing said interval; a single intelligence-bearing signal output for the tool; and means controlled by said electrical signal to transmit out of the tool over said signal output an intelligence-bearing signal representative of said measured interval.

2. A well logging tool as in claim 1 in which the distance between each adjacent pair of transducers is less than ten feet.

3. A well logging tool as in claim 1 in which the distance between each adjacent pair of transducers is between two and three feet.

4. A well logging tool as in claim 1 in which said transmitting transducer is adapted to transmit trains of waves in the frequency range between ten and sixty thousand cycles per second.

5. A well logging tool as in claim 4 in which said receiving transducers are selectively responsive to mechanical wave energy in said frequency range.

6. A well logging tool as in claim 1 in which the interval measuring and electrical signal-producing means comprises means triggered by the periodic pulse generating means in synchronism with the start of each train of waves to produce a control gate pulse extending over said portion of each period and means for applying the gate pulse to said individual amplifying means.

7. Well logging apparatus comprising the tool set forth in claim 1; a transmission line for carrying electrical power down an earth bore to components of the tool when it is suspended therein below the surface of the earth; the means last-mentioned in claim 1 including a free-running oscillator for generating a periodically repeated wave at a variable frequency substantially different from that of said electrical power, said oscillator being coupled to said signal output at the tool-end of the line to transmit said periodically repeated wave over it to equipment at the surface of the earth and means responsive to the signal produced by said time interval measuring means to control the frequency of the wave repetition of the free-running oscillator; and said logging apparatus further comprising equipment at the surface of the earth including means coupled to the top end of said line for receiving said periodically repeated waves therefrom to produce an indication in accordance with the frequency of repetition thereof.

8. Well logging apparatus as in claim 7 in which said last-mentioned means comprises a scale on which said indication is produced and having visible scale markings corresponding to different predetermined propagation velocities, said apparatus further comprising means for calibrating the indication producing means, said calibrating means including means in the tool for periodically applying to the interval measuring means pairs of pulses in synchronism with the periodic pulse generating means and with selectable fixed time separations corresponding to the intervals which would exist between the starting times of the wave trains produced by the two receiving transducers if transmitted waves from the transmitting transducer were propagated to them at said different predetermined velocities of propagation, means in said surface equipment for sending control voltages down said line to the tool to control the selection of said fixed time separations, and means for disabling said individual amplifying means from providing through-electrical-transmission from the receiving transducers to the interval measuring means when it is receiving any of said pairs of pulses with fixed time separations.

9. A well logging tool as in claim 1 in which each of said individual means includes a differentiator for reshaping the first cycle of each amplified train of said supersonic electrical waves into a very sharp pulse of shorter duration than said cycle whereby to more precisely define said interval before it is measured by said last-mentioned means.

10. Well logging apparatus comprising a hollow tool including a supersonic transmitting transducer and two supersonic receiving transducers each having a vibratory surface on the outside of the tool, means for hanging said tool from the end of a cable extending into an earth bore, the vibratory surfaces of said transducers being positioned on the tool in fixed spaced-relationship along an axis thereof corresponding to that of the bore when the tool is hanging therein, said tool containing means for periodically pulsing the transmitting transducer to produce recurrent trains of supersonic waves, each of the receiving transducers having its output coupled to the input of an individual signal channel, said individual channels having their outputs terminated in a common measuring circuit, the common circuit being effective in a portion of each period following a pulsing of the transmitting transducer to measure the time interval between the starting times of the first cycles of the individual trains of waves produced by the respective receiving transducers in response to energy which they receive from the transmitting transducers, and a gating circuit controlled by said periodically pulsing means for rendering effective electrical transmission through said individual signal channels from the receiving transducers to the common circuit for only a predetermined portion of each of the periods between successively transmitted trains of supersonic waves.

11. In a well logging system the combination comprising, a tool having an axis to correspond to that of an earth bore and comprising as a unitary structure a supersonic transmitting transducer and two supersonic receiving transducers supported at spaced apart positions, periodic pulse generating means for actuating the transmitting transducer to transmit recurrent trains of supersonic waves, individual means for each of the receiving transducers for amplifying trains of supersonic electrical waves produced thereby in response to acoustic wave energy received from said transmitting transducer, said individual means having a normally inoperative condition and including means for rendering said individual means operative during a fixed and relatively short portion of time following and predetermined with respect to the instant of initiation of each transmitted wave train, which portion of time includes the time period in which said supersonic waves passing through the formations surrounding said bore are expected to be received at the respective receiving transducers, and means for measuring the interval between the starting times of the first cycle of the separate trains of waves respectively amplified in said individual means and for producing an electrical signal having a characteristic representing said interval.

12. An acoustic well logging apparatus comprising a tool including a supersonic transmitting transducer and two supersonic receiving transducers, means for hanging said tool from the end of a cable extending into an earth bore, said transducers being positioned in said tool in fixed spaced relationship along an axis thereof corresponding to that of said bore, means for periodically pulsing the transmitting transducer to produce recurrent trains of supersonic waves, each of the receiving transducers having its output coupled to the input of an individual sginal channel, said individual channels having their outputs terminated in a common measuring circuit, the common circuit being effective in a portion of each period following a pulsing of the transmitting transducer to measure the time interval between the starting times of the first cycles of the individual trains of waves produced by the respective receiving transducers in response to energy which they receive from the transmitting transducer, and a gating circuit controlled by said periodically pulsing means for rendering effective electrical transmission through said individual signal channels from the receiving transducers to the common circuit for only a predetermined portion of each of the periods between successively transmitted trains of supersonic waves.

13. An acoustic well logging system comprising an elongated tool, means for transmitting acoustic pulses at predetermined time intervals to pass through a subsurface formation between first and second points spaced apart longitudinally on said tool, means for producing an electric signal having a characteristic that varies as a function of time, first means for applying a first electric pulse to said signal producing means at the occurrence of a given one of said acoustic pulses at said first point for initiating said electric signal, second means disposed at said second point and responsive to said given acoustic pulse for producing a second electric pulse, means controlled by said transmitting means for rendering effective electrical transmission through said second means during only a fixed and relatively short portion of each of said intervals, which portion is predetermined with respect to the extremities of each of said intervals and which portion includes the period of time during which said acoustic pulses passing through the subsurface formation are expected to be received at said second point on said tool and means responsive to said second electric pulse for determining the instantaneous value of said signal characteristic at the time of arrival of said given acoustic pulse at said second point.

14. An acoustic well logging system comprising an elongated tool, means for transmitting acoustic pulses at predetermined time intervals to pass through a subsurface formation between first and second points longitudinally spaced apart on said tool, means for producing an electric signal having a characteristic that varies as a function of time, first means for applying a first electric pulse to said signal producing means at the occurrence of a given one of said acoustic pulses at said first point for initiating said electric signal, second means disposed at said second point and responsive to said given acoustic pulse for producing a second electric pulse, at least one of said first and second means being normally in an inoperative condition, means coupled to said transmitting means for rendering said at least one of said first and second means operative for only a relatively short fixed portion of each of the intervals between the successively transmitted acoustic pulses, which portion is predetermined with respect to an extremity of each of the time intervals and which portion includes the period of time within which the acoustic pulses are expected at least said second point, and means responsive to said second electric pulse for determining the instantaneous value of said signal characteristic at the time of arrival of said given acoustic pulse at said second point.

15. An acoustic well logging system comprising an elongated tool, means for repeatedly generating and transmitting an acoustic pulse to pass through a subsurface formation between first and second points longitudinally spaced apart on said tool, first means for producing a first electric pulse coincident with the occurrence of said acoustic pulse at said first point, second means disposed at said second point responsive to said acoustic pulse for producing a second electric pulse, said second means having a normally inoperative condition, means controlled by said transmitting means for rendering said second means operative during a relatively short fixed portion of time between successively generated acoustic pulses, which portion of time occurs at a predetermined interval between the successively generated acoustic pulses and which portion of time includes the time during which the acoustic pulse passing through the subsurface formation is expected at the second point on said tool means for generating a sawtooth voltage, means for applying said first electric pulse to said sawtooth generating means to initiate said sawtooth voltage and means responsive to said second electric pulse for deriving from said sawtooth voltage an instantaneous voltage corresponding to the time interval required for said acoustic pulse to pass between said first and second points.

16. An acoustic logging system comprising means for transmitting acoustic pulses at predetermined intervals to pass through a subsurface formation between first and second points, means for producing an electric signal having a characteristic that varies as a function of time, first means for applying a first electric pulse to said signal producing means at the occurrence of a given one of said acoustic pulses at said first point for initiating said electric signal, second means disposed at said second point and responsive to said given acoustic pulse for producing a second electric pulse, means for rendering at least one of said first and second means inoperative for a given interval of time, means coupled and responsive to said transmitting means during only said given interval of time for applying at least one calibrating electric pulse to said signal producing means for calibrating the acoustic logging system, and means responsive to said second electric pulse for determining the instantaneous value of said signal characteristic at the time of arrival of said given acoustic pulse at said second point.

17. An acoustic well logging system comprising an elongated tool adapted to be passed through the borehole of a well, said tool having first and second transducers positioned in fixed spaced apart relationship in said tool, means for transmitting acoustic pulses at predetermined time intervals through a subsurface formation between said first and second transducers, means for producing an electric signal having a characteristic that varies as a function of time, first means for applying a first electric pulse to said signal producing means at the occurrence of a given one of said acoustic pulses at said first transducer for initiating said electric signal, second means coupled to said second transducer for producing a second electric pulse upon the arrival of said given acoustic pulse at said second transducer, means for actuating said second means to a cut-on condition for a relatively short fixed period of time which occurs at a predetermined space of time between successive acoustic pulses and then to a cut-off condition for the remaining and substantial portion of the interval between successive acoustic pulses, said short period of time including the portion of time within which the acoustic pulses passing through the subsurface formation are expected at said second transducer, means responsive to said second electric pulse for detecting the value of said signal characteristic at the time of arrival of said given acoustic pulse at said second transducer and means for indicating the detected value of said signal characteristic.

18. An acoustic well logging system comprising an elongated tool adapted to be passed through the borehole of a well, said tool having a transmitting transducer and first and second receiving transducers positioned in a fixed longitudinally spaced apart relationship in said tool, said first receiving transducer being disposed between said transmitting transducer and said second receiving transducer, means for actuating said transmitting transducer for producing acoustic pulses at predetermined time intervals, means for producing an electric signal having a characteristic that varies as a function of time, first means coupled to said first transducer for producing a first electrical pulse upon the arrival of a given one of said acoustic pulses at said first transducer for initiating said electric signal, second means coupled to said second transducer for producing a second electric pulse upon the arrival of said given acoustic pulse at said second transducer for terminating said electric signal, means for actuating said first and second means to a cut-on condition for a relatively short fixed period of time which occurs at a predetermined space of time between successive acoustic pulses and which includes the portion of time within which the acoustic pulses passing through the formations surrounding the borehole are expected at at least one of said first and second receiving transducers, and then to a cut-off condition for the remaining and substantial portion of the interval, and means for determining the instantaneous value of said signal characteristic at the time of arrival of said given acoustic pulse at said second transducer.

19. An acoustic well logging system comprising an elongated tool adapted to be passed through the borehole of a well, said tool having a transmitting transducer and first and second receiving transducers positioned in fixed longitudinally spaced apart relationship in said tool, said first receiving means being disposed between said transmitting transducer and said second receiving transducer, means for actuating said transmitting transducer for producing acoustic pulses at predetermined time intervals, an electrical channel including means responsive to electric pulses derived from said receiving transducers for producing an electric signal which is proportional to the travel time of one of said acoustic pulses between said first and second receiving transducers, said channel being in a normally inoperative condition, means for rendering said channel operative during a relatively short fixed period of time which occurs at a predetermined space of time between successive acoustic pulses and which includes the portion of time within which the highest and lowest velocity acoustic pulses passing through formations surrounding the borehole are expected at at least one of said first and second receiving transducers and means for indicating said electric signal.

References Cited in the file of this patent

UNITED STATES PATENTS

| | | |
|---|---|---|
| 2,200,476 | Mounce | May 14, 1940 |
| 2,231,243 | Beers | Feb. 11, 1941 |
| 2,233,992 | Wyckoff | Mar. 4, 1941 |
| 2,238,991 | Cloud | Apr. 22, 1941 |
| 2,370,692 | Shepherd | Mar. 6, 1945 |
| 2,530,631 | Rich | Nov. 21, 1950 |
| 2,560,587 | Miller | July 17, 1951 |
| 2,591,192 | Parr | Apr. 1, 1952 |
| 2,599,586 | Ross | June 10, 1952 |
| 2,691,422 | Summers et al. | Oct. 12, 1954 |
| 2,704,364 | Summers | Mar. 15, 1955 |
| 2,717,368 | Swan | Sept. 6, 1955 |